(12) United States Patent
Manders

(10) Patent No.: US 6,494,529 B1
(45) Date of Patent: Dec. 17, 2002

(54) OPEN ROOF CONSTRUCTION FOR A VEHICLE

(75) Inventor: Peter Christiaan Leonardus Johannes Manders, Horst (NL)

(73) Assignee: Inalfa Industries B.V. (NL)

(*) Notice: Subject to any disclaimer, the term of this patent is extended or adjusted under 35 U.S.C. 154(b) by 0 days.

(21) Appl. No.: 09/556,110

(22) Filed: Apr. 21, 2000

(30) Foreign Application Priority Data

Apr. 22, 1999 (NL) ............................................. 1011859

(51) Int. Cl.⁷ ................................................. B60J 7/05

(52) U.S. Cl. ........................ 296/222; 296/221; 296/223

(58) Field of Search ................................. 296/221–224

(56) References Cited

U.S. PATENT DOCUMENTS

| | | | |
|---|---|---|---|
| 4,417,763 A | 11/1983 | Schlapp et al. | 296/216 |
| 4,619,480 A | 10/1986 | Motoyama et al. | 296/217 |
| 4,647,104 A | 3/1987 | Kohlpaintner et al. | 296/221 |

(List continued on next page.)

FOREIGN PATENT DOCUMENTS

| | | | | |
|---|---|---|---|---|
| DE | 3442600 A1 | 5/1986 | | |
| DE | 3510759 | * 9/1986 | | 296/221 |
| DE | 3603314 A1 | 6/1987 | | |
| DE | 3930756 | 3/1991 | | |
| DE | 9116412 U | 2/1993 | | |
| DE | 4405742 C1 | 5/1995 | | |
| DE | 195 14 585 | 10/1996 | | |
| EP | 0033816 A1 | 8/1981 | | |
| EP | 0 143 589 | 6/1985 | | |
| EP | 0 218 890 | 4/1987 | | |
| EP | 0343750 A1 | 11/1989 | | |
| EP | 0517318 A1 | 9/1992 | | |
| EP | 0747249 A1 | 12/1996 | | |
| EP | 0899140 A1 | 3/1999 | | |
| FR | 2 495 068 | 6/1982 | | |
| FR | 2 527 995 | 12/1983 | | |
| JP | 0278422 | 12/1986 | | |
| JP | 0104734 | 5/1991 | | |
| JP | 404297323 | * 10/1992 | | 296/221 |

OTHER PUBLICATIONS

U.S. patent application Ser. No. 09/533,689, filed Apr. 21, 2000.
U.S. patent application Ser. No. 09/556,192, filed Apr. 21, 2000.
U.S. patent application Ser. No. 09/530,004, filed Apr. 21, 2000.
U.S. patent application Ser. No. 09/616,168, filed Jul. 14, 2000.
U.S. patent application Ser. No. 09/616,172, filed Jul. 14, 2000.
U.S. patent application Ser. No. 09/616,559, filed Jul. 14, 2000.
U.S. patent application Ser. No. 09/661,231, filed Sep. 13, 2000.
U.S. patent application Ser. No. 6/164,178, Stallfort, filed Dec. 26, 2000, class 296, subclass 222.
"The Woodworkers' Store", 1993–94 Catalog.

*Primary Examiner*—Dennis H. Pedder
(74) *Attorney, Agent, or Firm*—Westman, Champlin & Kelly, P.A.; S. Koehler

(57) ABSTRACT

An open roof construction for a vehicle having an opening in its fixed roof comprises a panel for selectively closing or at least partially opening the roof opening. An operating mechanism for the panel comprises a plate-shaped link, which is connected to the panel at the location of at least one point of attachment via an at least substantially vertical lip on the underside of the panel. The link and the lip are provided with a hole for allowing passage of a fixing element therethrough. The link includes two plate members at least at the location of the point of attachment, between which the lip of the closure element is accommodated.

9 Claims, 6 Drawing Sheets

U.S. PATENT DOCUMENTS

| | | | |
|---|---|---|---|
| 4,671,565 A | 6/1987 | Grimm et al. | 296/216 |
| 4,684,169 A | 8/1987 | Igel et al. | 296/221 |
| 4,725,092 A | 2/1988 | Reintges et al. | 296/221 |
| 4,752,099 A | 6/1988 | Roos et al. | 296/223 |
| 4,877,285 A | 10/1989 | Huyer | 296/216 |
| 5,020,849 A * | 6/1991 | Schlapp et al. | 296/221 |
| 5,058,947 A | 10/1991 | Huyer | 296/216 |
| 5,066,068 A | 11/1991 | Suzuki et al. | 296/221 |
| 5,259,662 A | 11/1993 | Huyer | 296/221 |
| 5,527,085 A | 6/1996 | Ochiai et al. | 296/223 |
| 5,593,204 A | 1/1997 | Wahl et al. | 296/223 |
| 5,845,959 A | 12/1998 | Ueki | 296/221 |

\* cited by examiner

OPEN ROOF CONSTRUCTION FOR A VEHICLE

BACKGROUND OF THE INVENTION

The invention relates to an open roof construction having a roof opening in a fixed roof.

Such an open roof construction is known, for example from European patent application No. 0899 140. In this prior art open roof construction, the link consists of a metal plate member at the location of the point of attachment, the hole being provided with screw thread for screwing the fixing means in the form of a fixing screw therein. The lip of the closure element is placed in abutment with the metal plate member and the lip and the metal plate member are screwed together by means of one or more shims.

The object of the present invention is to further improve the open roof construction of the kind referred to in the introduction.

SUMMARY OF THE INVENTION

In order to accomplish that objective, the open roof construction according to the invention is characterized in that the link includes two plate members at least at the location of the point of attachment, between which the lip of the closure element is accommodated.

By accommodating the lip of the closure element between the plate members, forces from the panel are as much as possible transmitted to the center of the link, seen in a transverse direction, thus minimizing the flexural forces to which the operating mechanism is exposed, in particular when the link is positioned centrally in the operating mechanism, seen in the transverse direction. Accommodating the lip between the two plate members makes it possible to refrain from the use of additional shims when the fixing element is a fixing screw, which reduces the number of parts. Furthermore a stable and solid connection is obtained by clamping the lip between the surfaces of the plate members. If there is a possibility of adjusting the lip and the link relative to each other, in particular for adjusting the height of the panel with respect to the link, the position of the lip between the link plate members and the abutment of the link against both sides of the lip provide increased friction, as a result of which the adjustment that has already been made will not change during definitive fixation.

When the plate members form the link or an important part thereof, it is advantageous if they are bent outwards at the location of the point of attachment so as to form a receiving slot for the lip of the closure element.

In the situation wherein each operating mechanism is accommodated in a guide rail which extends in the longitudinal direction of the open roof construction, and the operating mechanism includes a slide which is capable of sliding movement in the guide rail, it is very advantageous if the length of the fixing element and its position in the transverse direction of the open roof construction is such that in a lowermost position of the closure element, the fixing element is at least partially accommodated between walls of the slide and/or of the guide rail. This design makes it possible to realise a very compact construction, thus minimizing the amount of space that is lost.

BRIEF DESCRIPTION OF THE DRAWINGS

The invention will now be explained in more detail with reference to the drawings, which schematically show an exemplary embodiment of the open roof construction according to the invention.

DETAILED DESCRIPTION OF ILLUSTRATIVE EMBODIMENT

Figure 1:
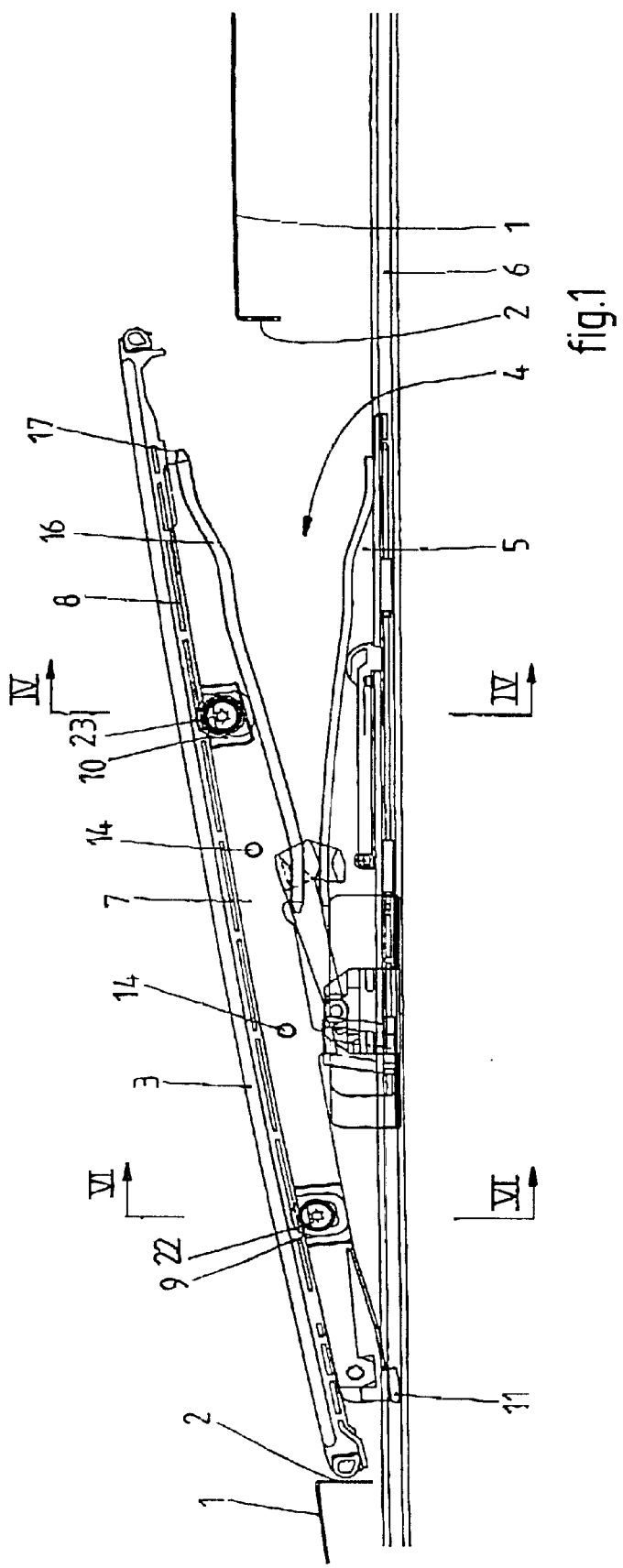
FIG. 1 is a longitudinal sectional view of the exemplary embodiment of the open roof construction according to the invention, in which the closure element is shown in an open ventilating position.
Figure 2:
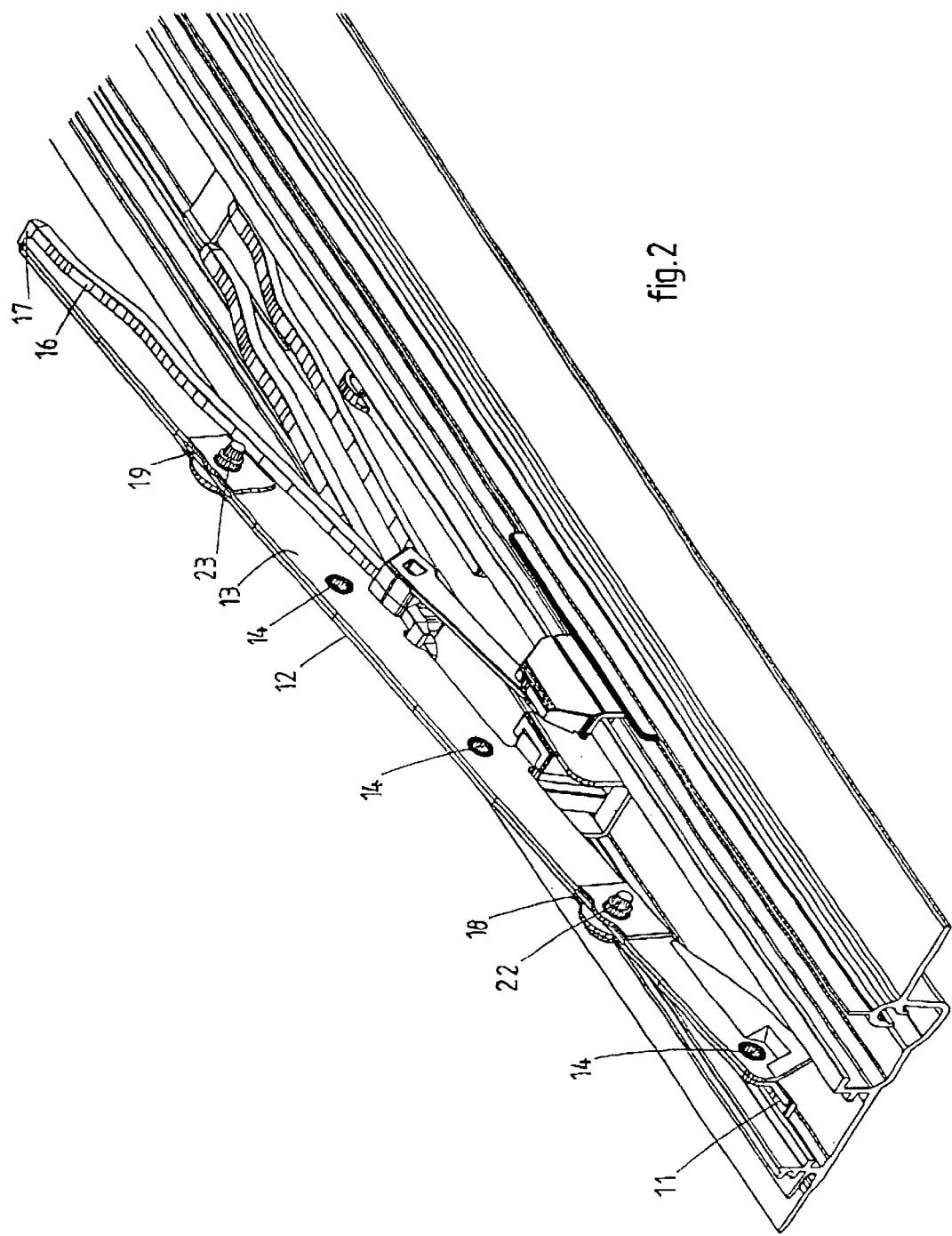
FIG. 2 is a larger scale perspective view of a guide rail and an operating mechanism on one side of the open roof construction of FIG. 1, likewise in the ventilating position.
Figure 3:
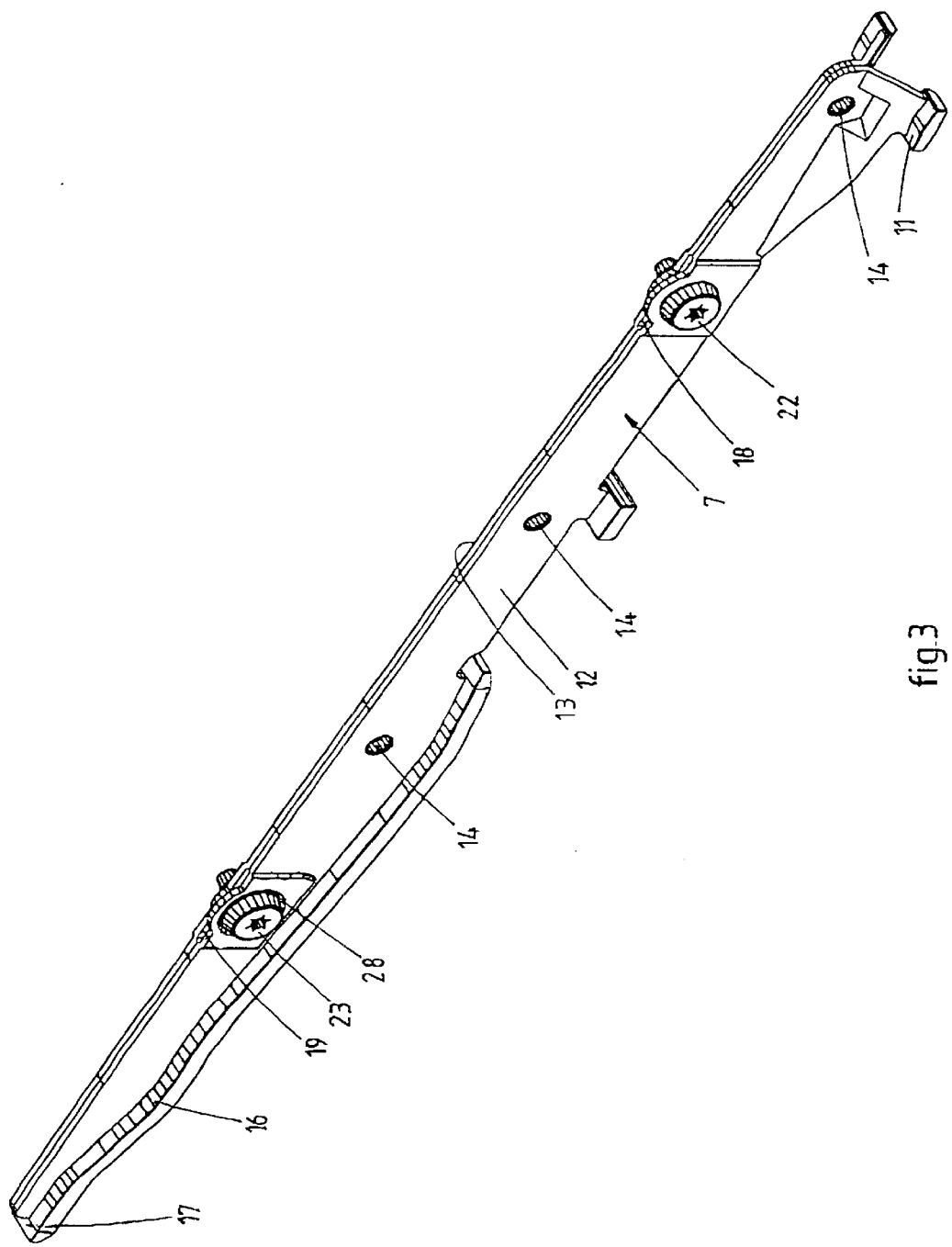
FIG. 3 is a perspective view of the link of the open roof construction of FIGS. 1 and 2, seen from the other side.
Figure 4:
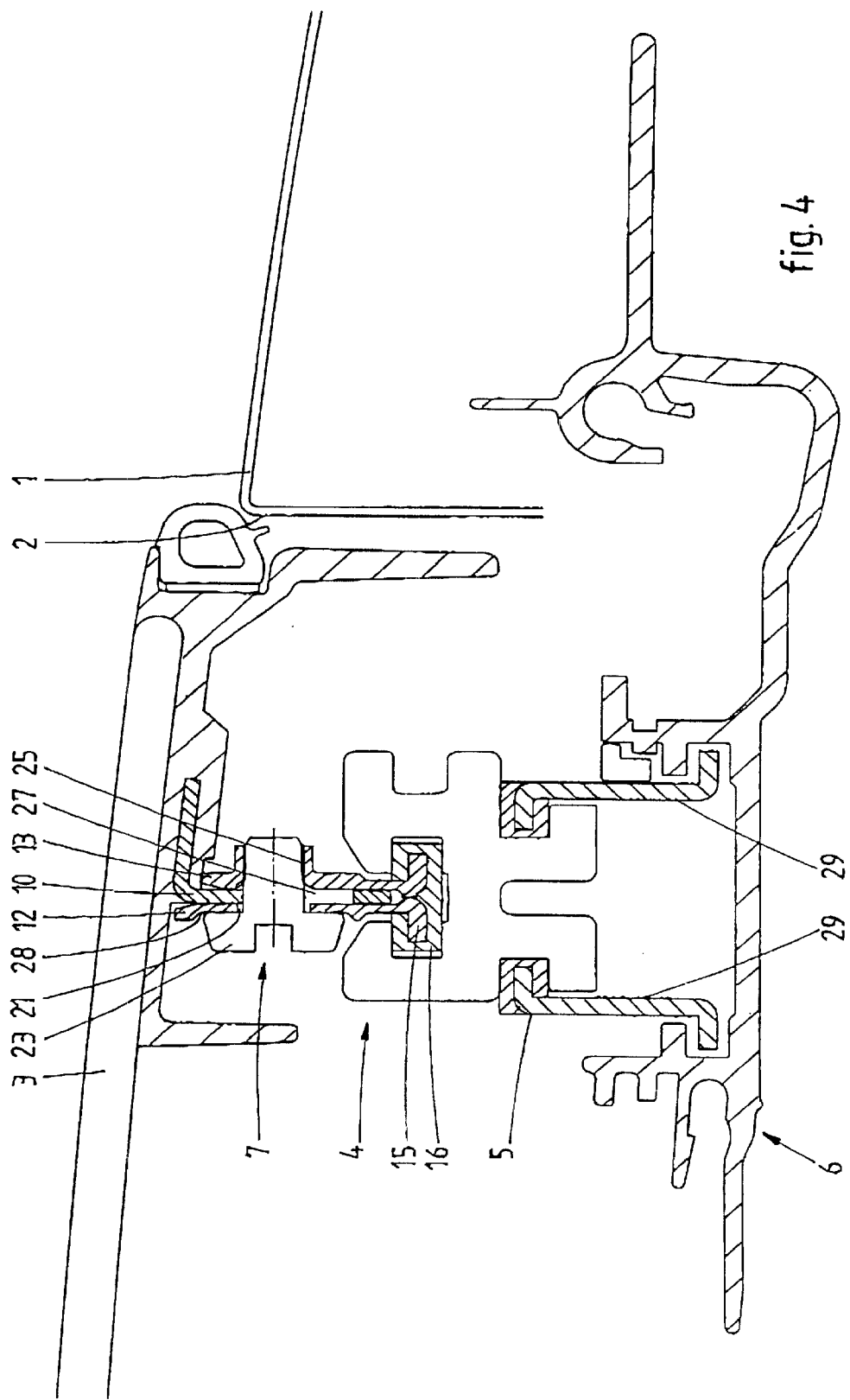
FIG. 4 is a larger scale sectional view along line IV—IV in FIG. 1, wherein the closure element is shown in a half-open ventilating position.

The drawings show a fixed roof 1 of a vehicle, such as a passenger car, which is provided with a roof opening 2 for receiving an open roof construction. The open roof construction includes a closure element 3 for selectively closing or at least partially opening the roof opening 2. In this embodiment the closure element 3 is a rigid panel, in particular a transparent panel of glass or plastic, but other closure elements such as louvres or a flexible liner are also conceivable. In the illustrated embodiment, a sliding-tilt roof is used, wherein panel 3 can be moved from the closed position in roof opening 2 (FIG. 6), on the one hand to an upwardly sloping ventilating position (FIG. 1) and on the other hand downwards (FIG. 5) and also rearwards to a position under the fixed roof 1 (FIG. 4).

In order to enable the movements of panel 3, panel 3 is fitted with an operating mechanism 4 at both edges extending in the longitudinal direction of the open roof construction. The operating mechanisms 4 each include a link slide 5, which, in this embodiment, is slideably accommodated in a guideway of a guide rail 6. Said guide rail 6 is mounted on or forms part of a stationary part (not shown), for example a frame, which is attached to the fixed roof 1 of the vehicle. The guide rails 6 extend along the longitudinally extending edges of the roof opening 2 and possibly rearwards thereof.

Part of the operating mechanism 4 is made up of a link 7, which is attached to the underside of panel 3, near the respective longitudinal edge, and in particular to a stiffening frame 8 thereof. To this end the stiffening frame 8 includes downwardly projecting lips 9, two for each longitudinal edge of panel 3 in this embodiment. The connection between lips 9 and link 5 forms part of the subject matter of the present invention and will be discussed in more detail hereafter.

Link 7 includes two sliding shoes 11 at its front end, which are slideably accommodated in associated grooves of guide rail 6.

As FIGS. 2–6 show, link 7 is made up of two link plates 12, 13 which are made of metal, in particular steel, which, in this embodiment, have been formed by means of a cutting operation and which are locally attached together, for example by spot-welding or riveting, as indicated at 14. The two link plates 12, 13 are substantially each other's mirror image and mounted in substantially the same manner on the two longitudinal edges of panel 3. The rear part of link plates 12 and 13 is formed with a horizontally outwardly extending flange 15 at the lower edge thereof. Said flanges 15 are enveloped in plastic, which has been formed thereon by injection molding, so as to form a guideway 16 having the desired curvature. Said guideway 16 forms part of the operating mechanism 4 for effecting the desired movements of panel 3. Since the operating mechanism 4 is hardly relevant, if at all, to the present invention, the various parts and the operation thereof will not be explained in more detail herein. A complete description is provided in co-pending applications entitled "Open Roof Construction for a Vehicle", Ser. No. 09/553,689, and entitled "Open Roof Construction for a Vehicle", Ser. No. 09/556,192, both of which are filed on Apr. 21, 2000, and which are incorporated herein by reference in their entirety. The figures do show, however, that the two guideways 16 are interconnected at the rear end of link 7 by means of an integrated connecting member 17, which also functions to hold the two link plates 12, 13 together.

As is furthermore shown in FIGS. 2–6, in order to enable a connection between lips 9, 10 and link 5, the link plates 12 and 13 have been bent slightly outwards by deformation so as to form a receiving slot 18, 19 which is just wide enough to receive the associated lip 9, 10. At the location of said receiving slot 18, 19, link plate 12 is provided with a passage 21, 22, respectively, for passing a fixing screw 22, 23 functioning as a fixing element, whilst link plate 13 is so formed at the location of receiving slot 18, 19 that an internally threaded hole 24, 26 is formed. The external screw thread of the fixing screw 22, 23 engages and thus clamps the link plates 12, 13 together with the respective lip 9, 10 positioned therebetween. Lips 9, 10 are provided with a hole 26, 27 which is slightly elongated in a vertical direction, which makes it possible to adjust link 7 slightly in the vertical direction relative to panel 3.

Link plates 12, 13 may comprise a slightly reduced thickness at the location of receiving slots 18, 19 in comparison with the remaining portion of the link plates. Link plate 12 can also be formed with a further indentation 28 surrounding through hole 21 at the location of the rear receiving slot 19, which functions to receive part of the head of the fixing screw 23.

Figure 5:
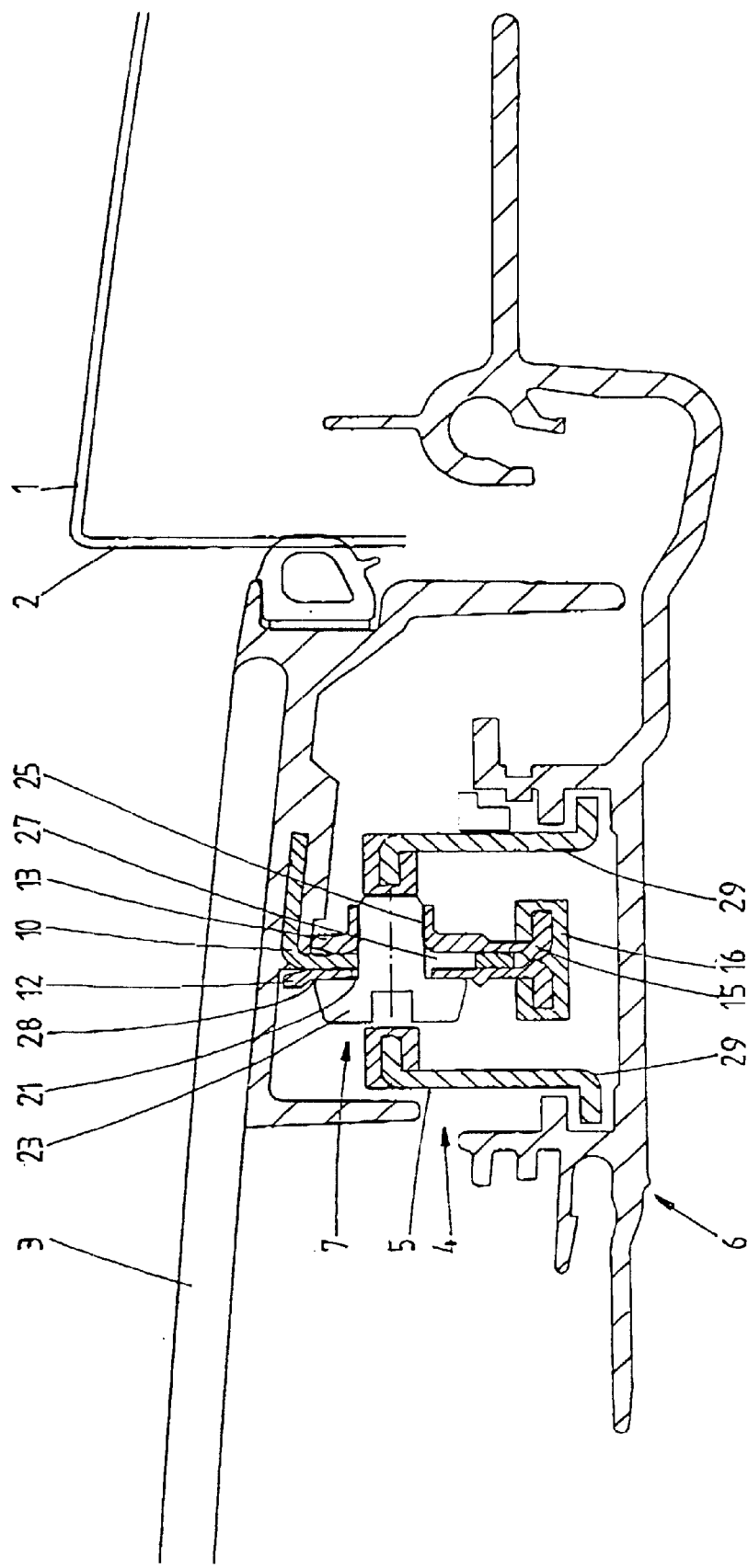
FIG. 5 is a view corresponding to FIG. 4, wherein the closure element is shown to have been moved downwards.

As is shown in FIG. 5, as a result of this shape of the link plates 12, 13 at the location of lip 10, fixing screw 23 is so positioned in a transverse direction and the length of the fixing screw 23 can be so small that the fixing screw 23 can be accommodated between side walls 29 of link slide 5 in a downward position of panel 3, thus making it possible to realise a very compact construction having a small overall height of the open roof construction. The figure furthermore shows that lips 9 and 10 are positioned in the center of the operating mechanisms 4, seen in a transverse direction, as a result of which the forces from panel 3 are transmitted to the center of the operating mechanisms 4, thus preventing the development of flexural forces in the transverse direction, which might lead to a reduced strength, or increased wear and noise from the operating mechanism 4.

Figure 6:
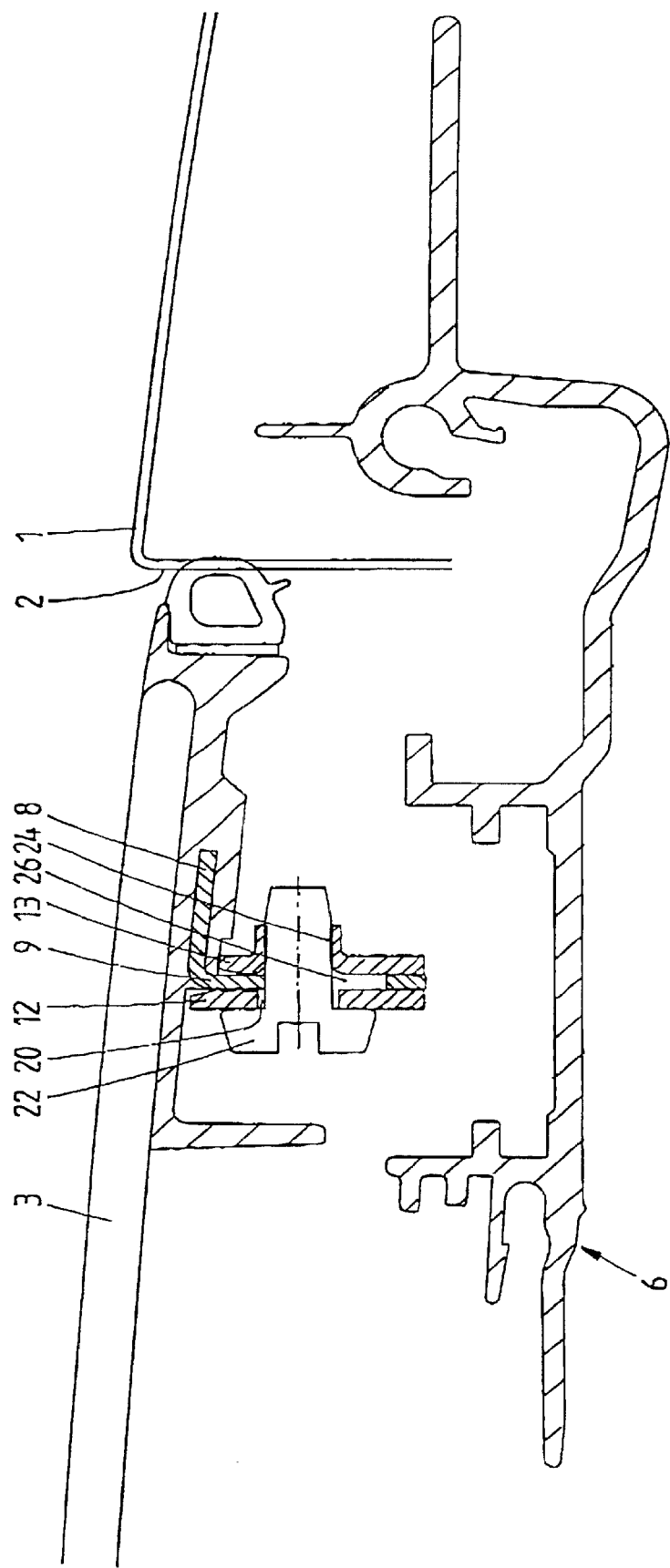
FIG. 6 is a sectional view along line VI—VI in FIG. 1.

FIG. 6 furthermore shows that no indentation of link plate 12 is required at the front lip 9, since the guide rail 6 is wide enough at that location for receiving the link and the fixing screw 22.

From the foregoing it will be understood that the invention provides an open roof construction and a link therefor which is remarkable for its compactness, simplicity and stability.

The invention is not restricted to the above-described embodiment as shown in the drawing, which can be varied in several ways without departing from the scope of the invention. Thus it is possible to form the link of a single plate member which has been folded double instead of using two separate plates. Furthermore it is possible to use a different fixing element, for example a pop rivet.

What is claimed is:

1. An open roof construction for a vehicle having an opening in its fixed roof, comprising:

a closure element for selectively closing and at least partially opening the roof opening, and at least one operating mechanism including a plate-shaped link, which is secured in a fixed relation to said closure element at multiple points of attachment via at least one substantially vertical lip on the underside of said closure element, said link and said at least one lip being provided with holes for allowing the passage of a respective fixing element, said link including first and second plate members at the points of attachment and remote from the points of attachment, the at least one lip of the closure element being accommodated between said first and second plate members at the points of attachment, the plate members being additionally secured together remote from said points of attachment.

2. The open roof construction according to claim 1, wherein the plate members form the link, which plate members are bent outwards at the location of the points of attachment so as to form a receiving slot for the at least one lip of the closure element.

3. The open roof construction according to claim 2, wherein at least one of said plate members comprises a reduced thickness at the location of said receiving slot.

4. The open roof construction according to claim 3, wherein the fixing element comprises a fixing screw, and a hole in the first plate member is internally threaded for receiving the fixing screw therein, a hole in the second plate member forming a passage for the fixing screw, and a part of the second plate member which surrounds said passage is arranged for abutment of a screw head of the fixing screw.

5. The open roof construction according to claim 4, wherein the second plate member comprising the passage for the fixing screw is locally formed with an indentation surrounding the passage for receiving the screw head.

6. The open roof construction according to claim 1, wherein said link includes a guideway for cooperation with a guide member of the operating mechanism, wherein the guideway is configured as a curved rib which projects from either side of the link.

7. The open roof construction according to claim 6, wherein the guideway is made up of outwardly bent flanges on the lower side of the plate members, which are enveloped in a plastic.

8. The open roof construction according to claim 1, wherein said operating mechanism is accommodated in a guide rail which extends in the longitudinal direction of the open roof construction, and the operating mechanism including a slide which is capable of sliding movement in the guide rail after the closure element has been moved to a lowermost position by the operating mechanism, wherein the fixing element is of such length and has such position in the transverse direction of the open roof construction that, in the lowermost position of the closure element, the fixing element is at least partially accommodated between walls of at least one of the slide and the guide rail.

9. The open roof construction according to claim 8, wherein the closure element comprises a rigid panel, which can be moved downward from the closed position in the roof opening to the lowermost position and subsequently rearwards to a position under the fixed roof of the vehicle.

* * * * *